United States Patent

McDonald et al.

[15] 3,685,405
[45] Aug. 22, 1972

[54] EXTRUSION MOULDING

[72] Inventors: Dean Barry McDonald, 1 Deepdene Ave., Belleview Heights, Australia 5050; Albert James McBride, 19 Delamere Ave., Springfield, Australia 5062

[22] Filed: April 14, 1970

[21] Appl. No.: 28,401

Related U.S. Application Data

[63] Continuation of Ser. No. 841,554, July 14, 1969, abandoned.

[52] U.S. Cl. ....................94/46 R, 264/70, 425/432
[51] Int. Cl. ...........................................E01c 19/48
[58] Field of Search .....25/32, 41 J, 118 W; 94/46 A, 94/46 R, 46 AC; 25/41 R; 264/70; 425/432

[56] References Cited

UNITED STATES PATENTS

| | | | |
|---|---|---|---|
| 2,101,031 | 12/1937 | Little | 94/46 R |
| 2,225,015 | 12/1940 | Lebelle | 25/41 J X |
| 3,098,415 | 7/1963 | Guntert et al. | 94/46 R |
| 3,452,406 | 7/1969 | Morgan | 25/41 J X |

*Primary Examiner*—Robert D. Baldwin
*Attorney*—Stevens, Davis, Miller & Mosher

[57] ABSTRACT

A moulding machine for the continuous extrusion moulding of concrete comprising a hopper for the concrete to be moulded, a mould opening into the hopper, immersion vibrators in the hopper and concentrated mainly in the region of the hopper above the top of the mould, a further vibrator attached to the mould to prevent adhesion of the moulding to the mould, said hopper and mould being movable to extrude the concrete through the mould.

12 Claims, 6 Drawing Figures

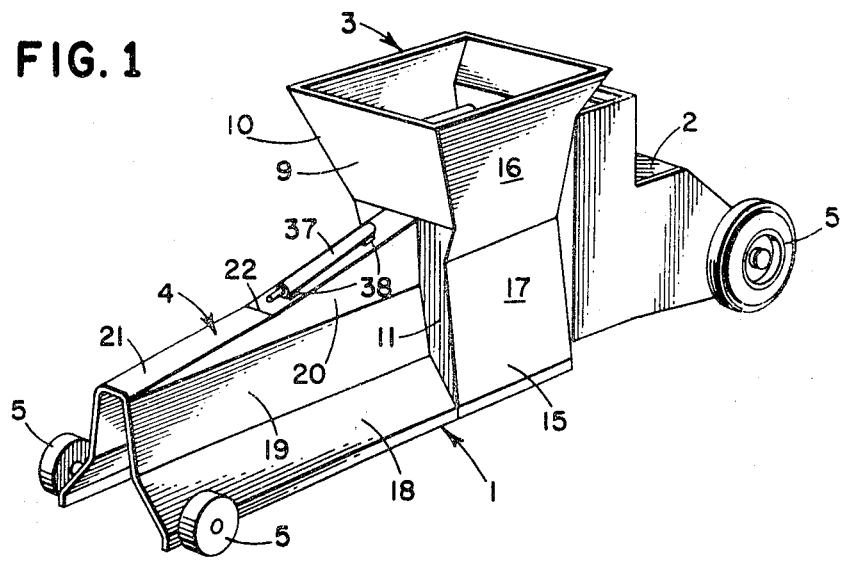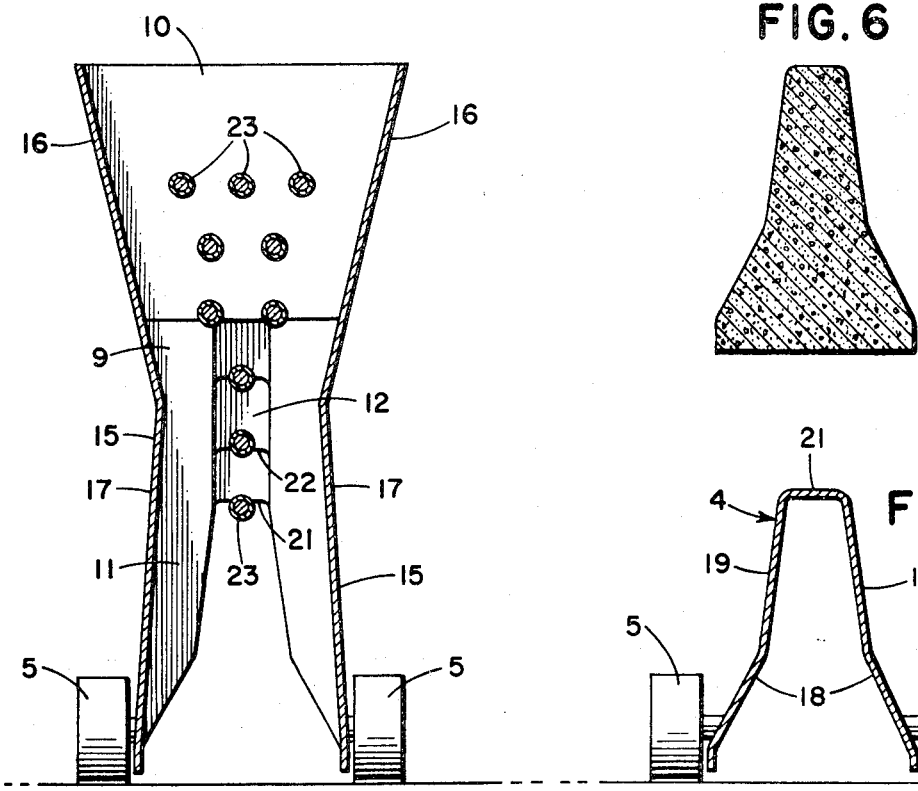

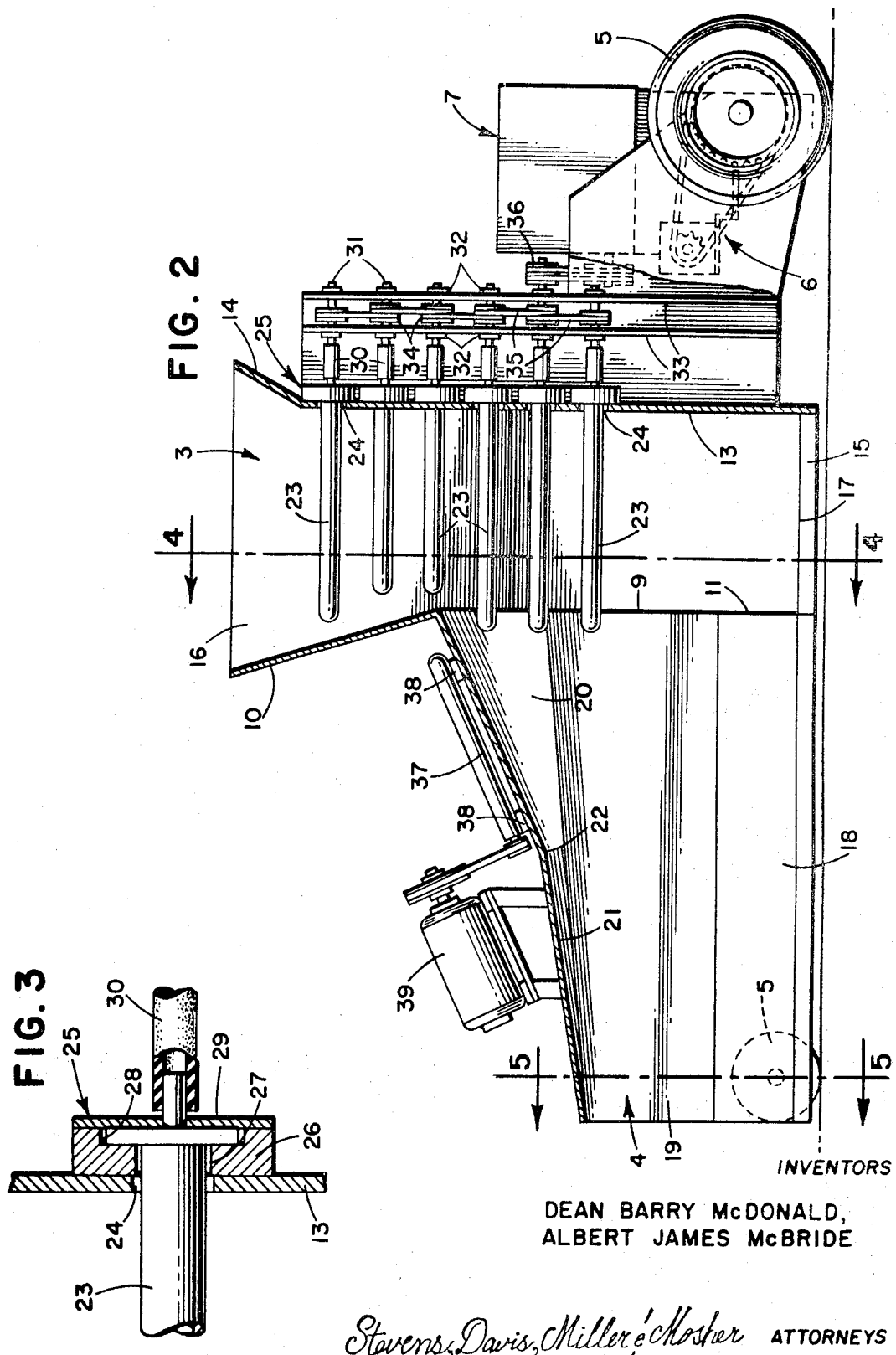

EXTRUSION MOULDING

This application is a continuation of our co-pending application Ser. No. 841,544 of July 14, 1969, now abandoned.

This invention relates to an improved extrusion moulding machine using various materials, especially concrete. The invention is particularly applicable, although not limited, to a machine for continuously extruding concrete sections such as are used for street guttering and median strips.

Presently known concrete extrusion molding machines utilize standard extrusion screws which force the concrete mixture under pressure through the mold. Such machines have been adapted for continuous on-site molding of sections, such as for guttering, but their success in this and other applications has been found to be somewhat limited. Large size moldings are not capable of production by these machines because the concrete must incorporate a certain proportion of metal and this fouls the extrusion screw. Accordingly the production of a continuously extruded self-supporting molding of large dimensions has been found to be impossible by presently known methods or machines and it is therefore necessary to form static molds for such sections. This method of molding is very slow and expensive.

It is one object of the present invention to provide a machine for continuously extruding a concrete molding, especially sections of large dimensions.

An embodiment of the invention will now be described with reference to the accompanying drawings in which:

FIG. 1 is a perspective view from the rear of a molding machine embodying the invention;

FIG. 2 is a longitudinal sectional side elevation of the machine;

FIG. 3 is an enlarged fragmentary sectional elevation of a vibrator mount;

FIG. 4 is a transverse sectional end elevation taken along line 4—4 of FIG. 2;

FIG. 5 is a similar transverse sectional elevation taken along line 5—5 of FIG. 2; and FIG. 6 is a sectional end elevation of a concrete molding formed by the machine showing the even distribution of metal therein.

The machine described in the following is designed for the continuous molding of a concrete section 32 inches high suitable for use as highway or freeway median section. However, it should be understood that the machine may be modified for the molding of larger or smaller sections.

The molding machine comprises a body 1 including a motor and drive compartment 2, a hopper 3 and a mold 4, said body 1 being supported for longitudinal movement by wheels 5. The front pair of wheels 5 are driven by a transmission arrangement 6 (FIG. 2) housed in the compartment 2 and driven by an hydraulic motor (not shown) powered by a motor 7 and capable of driving the body 1 forwardly at from 0 to 15 feet/minute.

The hopper 3 is open at the top and bottom thereof and includes a rear wall 9 having an inwardly sloping upper section 10 and a vertical lower section 11 in which a mold opening 12 is formed. The opening 12 extends from the top to the bottom of the lower section 11 and is surrounded by the mold 4 which is secured, say by welding, to the lower section 11. The front wall 13 of the hopper 3 is flat and vertical except for a short inwardly sloping inlet section 14 at the top. The side walls 15 of the hopper 3 have upper sections 16 which are convergent and lower sections 17 which are slightly divergent, the level at which the two sections meet being below the top of the molding opening 12.

The mold 4 includes side walls 18 each having a lower part 19 which has a profile corresponding to the shape of the side of the molding to be produced and an upper part 20 extending vertically from the lower part and tapering in its vertical dimension from the front of the mold to the rear of the mold where it disappears as shown in FIG. 1. The mold side walls 18 are closed at their upper end by a mold top 21 formed integrally with or welded to the upper part 20. The top 21 is shown to have a discontinuity of slope at 22 although this may not be necessary for proper operation of the machine.

The front wall 13 of the hopper 3 supports a plurality of immersion vibrators 23 of any suitable type which project through holes 24, of larger diameter than the bodies of the vibrators 23, into the hopper 3. Each vibrator 23 is mounted on the front wall 13 of the hopper 3 by means of a 'floating' vibrator mount 25 secured to the wall 13 by bolts (not shown). Referring to FIG. 3, the vibrator mount 25 is seen to include a block 26 having slotted hole 27 for the vibrator body and a recess 28, the vibrator being held in the block 26 by a plate 29 secured to the block by the mounting bolts (not shown). The hole 27 and recess 28 have larger diameters than the diameters of the corresponding parts of the vibrator 23 so that the vibrator is free to 'float' to a limited extent in use. This type of mounting, or some other mounting which allows limited free movement of the end of the vibrator, is necessary to facilitate maximum vibration transmission to the material in the hopper 3.

Drive to each vibrator 23 is through a flexible drive tube 30 connected to the shaft of the vibrator and to a shaft 31 mounted in bearings 32 in a pair of spaced plates 33 and having pulleys 34 secured thereto between the plates 33. The pulleys 34 are interconnected by belts 35 and one shaft projects from the front plate 33 where it supports pulleys 36 driven through belts by the motor 7. The speed of the vibrators is variable between 2,000 and 6,500 r.p.m. depending on the concrete mixture sued and the speed of the body 1.

The vibrators 23 are arranged in a V-shaped pattern (FIG. 4) with most of the vibrators concentrated in the upper part of the hopper 3, that is, in the part of the hopper above the level of the top of mold opening 12. There are three vibrators below this level and these project a small amount into the mold 4 itself. However, it is believed that the performance of the machine would not be greatly affected, and may even be improved, if say the lowermost vibrator, or for that matter, all three lower vibrators, were to be removed to a position above the level of the mold opening 12.

A further vibrator 37 is welded to mounting blocks 38 welded to the top 21 of mold 4 forwardly of transition 22. This vibrator is driven by an electric motor 39 and has its speed variable between 3,000 and 7,000 r.p.m. depending on the conditions mentioned above.

The vibrators 23 and 37 may be of any suitable construction which will facilitate the transmission of the required amount of vibration to the material in the hopper 3 and to the mold 4. Since the vibrator construction forms no part of the invention, it will not be described.

In use, the hopper 3 is filled, and preferably kept full, with a suitable concrete mixture preferably with a 'slump' of form one and a half inches to three inches. The vibrators 23 and 37 are then started and the machine driven forwardly at a low speed. The vibrators 23, being immersed in the concrete, vibrate the mixture to allow it to be pushed through the opening 12 by the movement of the body 1 and into the mold 4 and to ensure that the metal is evenly distributed throughout the section produced (see FIG. 6). When the material is in the mold 4 itself, the vibrator 37 ensures that the molding does not adhere to the mold 4 particularly at the top 21 thereof. It is found, for the 32 inch section shown, that if the vibrator 37 is disconnected or run too slow for the mixture concerned, the molding will either tear open along the top or the machine will not be able to draw the mold 4 over the molding. Furthermore, the vibrator 37 tends to draw the 'fines' in the concrete to the surface of the molding to reduce or remove the necessity for the molding to be trowelled smooth.

It may be advantageous to replace vibrator 37 by two similar vibrators secured to the upper part 20 of each mold side wall 18. This arrangement would ensure a more even distribution of vibration to the mold 4 and may improve the quality of the mold.

It is also found, for the section in question, that the lower section 11 of the rear wall 9 of the hopper should be perpendicular, or at least nearly perpendicular, to the longitudinal axis of the mold 4. If the forward end of the mold 4 were to be expanded so as to be secured directly to the side walls 15 of the hopper 3 it would be found that the mold 4 would not fill with material. However, it may not be essential for this section of wall 9 to be shear for smaller section molds.

Similarly, it is necessary for successful molding of the section in question that the mold 4 be enlarged in the vertical direction at the forward end thereof, by about one third of the height of the molded section, as shown in the drawing or in a similar manner. If the mold is not enlarged, the mold 4 will not fill properly. Again, it may not be essential for the mold to be vertically enlarged in this manner for smaller sections.

It has been found that an extruded concrete section produced by the above machine is completely self-supporting as it issues from the mold and that such moldings have good metal distribution and less 'pin marks' than smaller sections formed by known extrusion processes. The speed of extrusion will depend on the size of the mold, the concrete mixture used and the speed of the vibrators. However, speeds of 6 feet a minute molding the 32 inch section described have been successfully attained and higher speeds are believed possible.

We claim:

1. A moulding machine for the continuous extrusion of a relatively large size moulding comprising a hopper open at the top and bottom for containing the material to be moulded, an elongate mould member, substantially narrower than said hopper, opening through one wall of the hopper having parallel sides and being open at the bottom thereof, a plurality of immersion vibrators positioned in the hopper, said hopper and mould being movable in the longitudinal direction of the mould member to extrude the material in the hopper through the mould member, at least those parts of said one hopper wall adjacent either side of the mould opening being flat and substantially perpendicular to the longitudinal axis of the mould member and to the walls of said mould member at said one wall, and the upper side of said mould member having a vertically extending substantial taper opening to said hopper.

2. A moulding machine as claimed in claim 1, wherein a majority of the plurality of said vibrators are positioned in an upper part of said hopper above the level of the top of the opening of the mould member into the hopper.

3. A moulding machine as claimed in claim 2, wherein said vibrators are mounted on the wall of the hopper opposite said one wall by means of mounting devices which allow a limited amount of free movement of the mounted end of the vibrators.

4. A moulding machine as claimed in claim 2, wherein there is at least one vibrator mounted below the level of the top of the opening of the mould member into the hopper, the or each such vibrator projecting a small amount into the mould member.

5. A moulding machine as claimed in claim 1, wherein a further vibrator is attached to the mould member.

6. A moulding machine as claimed in claim 5, wherein said further vibrator is attached to the top of the mould member and is closer to the hopper than to the outlet of the mould member.

7. A moulding machine as claimed in claim 1, wherein the mould member is vertically extended at the opening to the hopper by about one third of the height of the moulded section, said extension tapering substantially uniformly, in the vertical direction, to nothing at the outlet of the mould member.

8. A moulding machine as claimed in claim 6, wherein said further vibrator is attached to the mould member closer to the hopper than to the outlet of the mould member.

9. A moulding machine as claimed in claim 8, wherein there are at least six vibrators in a V-shaped pattern when viewed in the longitudinal direction of the machine, at least five of the vibrators being located above the level of the top of the mould opening.

10. A moulding machine as claimed in claim 1, wherein the mould member is elongate in the vertical dimension and all of the immersion vibrators are located above the level of the top of the mould opening.

11. The device of claim 1 wherein said one wall of the hopper is vertical along the portion to which the mould side wall is attached so that a vertical substantially right angle joint is formed between said walls.

12. A device for extrusion moulding a monolithic material into a longitudinally extending upstanding shape of relatively large dimension without fixed forms, comprising:

a. a hopper to receive the material to be moulded;
b. means within the hopper to vibrate said material;
c. an opened bottomed mould positioned adjacent the end wall of said hopper, said mould having parallel side walls conforming to said shape and having a cross-section substantially narrower than said hopper with its longitudinal axis parallel to the axis of said shape;

d. means to move the mould and hopper along their longitudinal axis;

e. an opening between said hopper and said mould defined by a joint between said mould side walls and said hopper end wall, said walls being substantially perpendicular to each other;

f. the upper side of said mould having a vertically extending substantial taper opening to said hopper.

* * * * *

UNITED STATES PATENT OFFICE
CERTIFICATE OF CORRECTION

Patent No. 3,685,405                    Dated August 22, 1972

Inventor(s) Dean Barry McDONALD et al

It is certified that error appears in the above-identified patent and that said Letters Patent are hereby corrected as shown below:

The Assignee should be listed as follows:

CHENEY EXTRUSIONS (AUSTRALIA) LIMITED, St. Marys, South Australia, Australia

Signed and sealed this 13th day of March 1973.

(SEAL)
Attest:

EDWARD M. FLETCHER, JR.          ROBERT GOTTSCHALK
Attesting Officer                Commissioner of Patents